Figure 1:
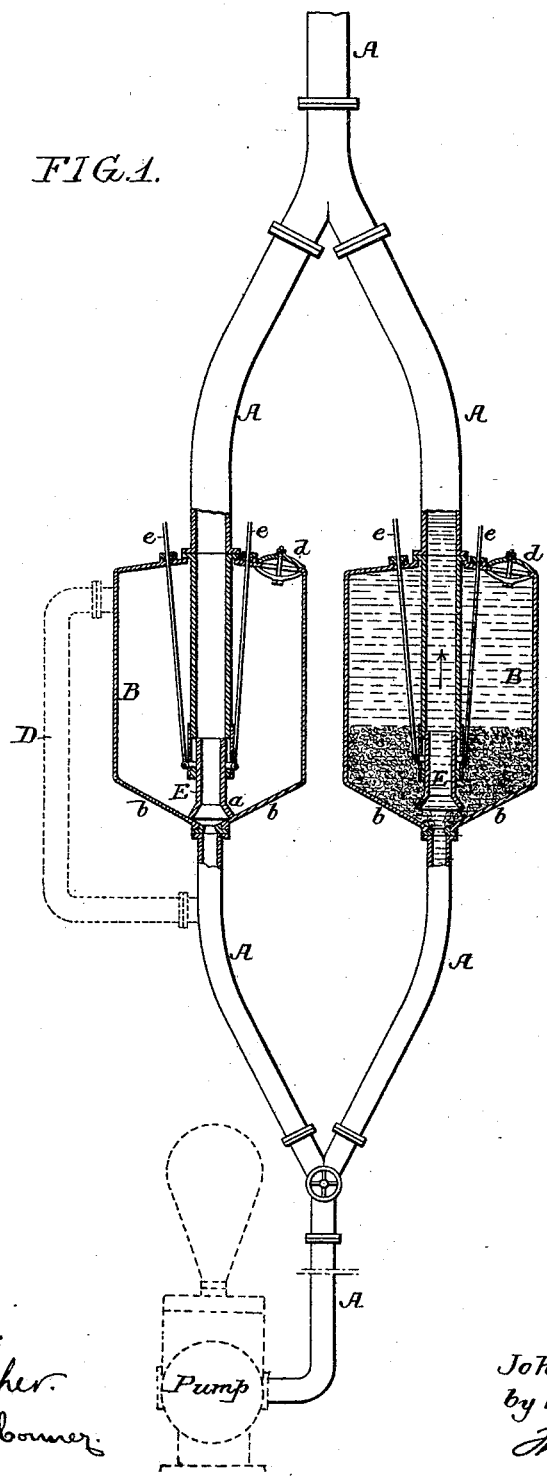

(No Model.) 2 Sheets—Sheet 1.

J. P. GRISCOM.
PROCESS OF AND APPARATUS FOR MOVING GRANULAR MATERIALS.

No. 496,684. Patented May 2, 1893.

Witnesses:
R. Schleicher
William D. Conner

Inventor:
John P. Griscom
by his Attorneys

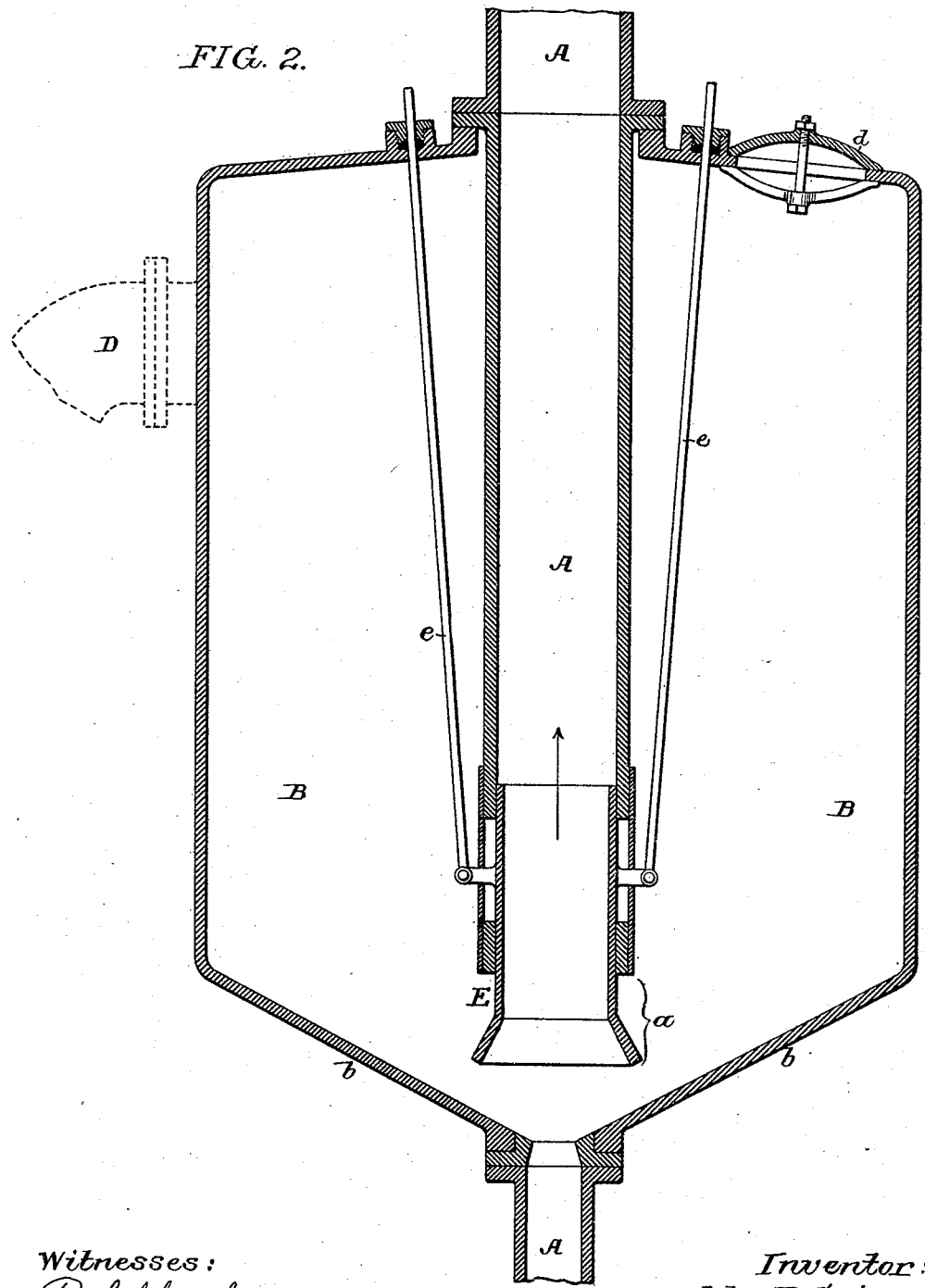

UNITED STATES PATENT OFFICE.

JOHN P. GRISCOM, OF POTTSVILLE, PENNSYLVANIA.

PROCESS OF AND APPARATUS FOR MOVING GRANULAR MATERIALS.

SPECIFICATION forming part of Letters Patent No. 496,684, dated May 2, 1893.

Application filed October 27, 1892. Serial No. 450,141. (No model.)

*To all whom it may concern:*

Be it known that I, JOHN P. GRISCOM, a citizen of the United States, and a resident of Pottsville, Schuylkill county, Pennsylvania, have invented certain Improvements in Processes of and Apparatus for Moving Granular Materials, of which the following is a specification.

The object of my invention is to convey broken stone, minerals, &c., to a distance, through the medium of a moving volume of water. This object I attain in the following manner, reference being had to the accompanying drawings, in which—

Figure 1, is a diagram illustrating the method of carrying out my invention; and Fig. 2, is a sectional view through one of the charging hoppers.

The main feature of my invention consists in so arranging the charging hopper in relation to the conveying tubes that the material to be conveyed will be confined in a closed vessel, so that the pressure above the load will be equal to the pressure in the tube, thus allowing the material to flow into the tube and to be carried to its destination.

Referring to the drawings, A is the tube through which the moving column of water passes in the direction of the arrow. The tube is discontinued at $a$ to allow for the inlet of material to be conveyed. The bottom $b$ of the hopper B is preferably in line with the lower portion of the opening, and is inclined to allow the material to flow toward this opening which in the present instance is centrally situated in respect to the hopper or chamber B. An inlet opening is formed in the upper portion of the chamber which, however, is closed by a cap $d$.

E is a valve adjustable so as to close, open or regulate the area of the passage between the chamber or hopper and the tubular conveyer. Rods $e$ connected to arms on this valve pass through stuffing boxes in the upper portion of the casing of the chamber so that the valve can be operated from the outside of the hopper. By regulating the position of this valve more or less material is allowed to pass from the hopper into the tubular conveyer.

D is a pipe communicating with the upper portion of the hopper or chamber above the material and with the tubular conveyer as shown by dotted lines in the drawings, so that if necessary, the pressure can be equalized by forming a communication between the moving column of water and the hopper, but in a number of experiments that I have made, I have found that in many cases this connection can be dispensed with, as the flow of water into the chamber direct from the tube through the opening $a$ not only equalizes the pressure, but also agitates the material within the hopper to such a degree that it will flow or travel into the path of the moving column of liquid in proper proportions and will not clog the opening, as would be the case in some instances where the water for equalizing the pressure was introduced at other points.

The operation of the apparatus is as follows:—Before any material is introduced into the conveyer, the water has received its full momentum, the conveyer, being at all times full, so that the water is not propelled by jets, but is carried bodily along by the pressure back of it, and its momentum. The chamber or chambers where a series of chambers are used, are loaded with the material, either fine or coarse as the case may be, and the feed openings for the material are closed so that pressure can be applied within the vessel. The valve E is then opened sufficiently, and the water from the column breaks through the body of material to be fed, agitating the material, and finally filling the chamber until the pressure therein is equal to the pressure in the tubular conveyer. The material owing to its weight falls by gravity into the direct path of the moving column of water, and must of necessity be carried with the water to its destination, as the column of water is solid and every particle of the same is moving. The material by this means can be carried to any given point providing the pressure of water is sufficient to carry the volume of material fed into the moving column. By the process and apparatus shown, materials which could not pass through pump valves can be readily moved and carried and the material can be carried to a much greater height than would be possible if it were impelled by a jet of water exposed to the atmosphere.

My invention is particularly adapted for moving and conveying coal, either in the lump or granular state, and by the use of my invention a continuous stream of coal can be carried from the mine to a distant point, and there discharged in suitable bins.

I claim as my invention—

1. The process herein described of conveying granular material, said process consisting in first charging a compartment with the material to be conveyed; second, closing the compartment to the atmosphere; third, imparting movement to a solid column of water then causing the water to enter the compartment containing the material to be conveyed until the pressure within the compartment is equal to the pressure of the column due to the resistance caused by the height and distance of the discharge point, when at such time the material will be carried from the compartment by the moving column of water to the point of discharge, substantially as described.

2. In apparatus for conveying granular material, the combination of the tubular conveyer having a free discharge, means for forcing water under pressure therethrough, a compartment surrounding said tubular conveyer and communicating therewith at its base a feed-opening for said compartment, a cover therefor, so that the compartment will be closed to the atmosphere when the conveyer is in operation, whereby the water as it passes through the conveyer will flow into the compartment until the pressure therein equals the pressure due to the resistance in the conveyer beyond the compartment caused by the height and distance of the discharge point, when the material will be carried from said compartment through the conveyer to the point of discharge, substantially as described.

3. In apparatus for conveying granular material, the combination of the tubular conveyer having a free discharge, means for forcing water under pressure therethrough, a compartment surrounding said tubular conveyer and communicating therewith at its base, a cylindrical valve flared at its lower end and adapted to seat itself on the bottom of the compartment, a feed-opening for the compartment, a cover therefor, substantially as described.

In testimony whereof I have signed my name to this specification in the presence of two subscribing witnesses.

JNO. P. GRISCOM.

Witnesses:
THOS. A. TINDLE,
GEORGE WERNERT.